US012594540B2

(12) United States Patent
Hwang et al.

(10) Patent No.: US 12,594,540 B2
(45) Date of Patent: Apr. 7, 2026

(54) CARBON DIOXIDE CAPTURE COMPOSITE PARTICLES AND METHOD OF PRODUCING THE SAME

(71) Applicant: POSTECH Research and Business Development Foundation, Pohang (KR)

(72) Inventors: Dong Soo Hwang, Pohang (KR); Sung Bin Ju, Pohang (KR); Dong Yeop Oh, Daejeon (KR); Ki Tack Lee, Pohang (KR); Je Young Park, Daejeon (KR)

(73) Assignee: POSTECH RESEARCH AND BUSINESS DEVELOPMENT FOUNDATION, Pohang (KR)

( * ) Notice: Subject to any disclaimer, the term of this patent is extended or adjusted under 35 U.S.C. 154(b) by 584 days.

(21) Appl. No.: 18/096,116

(22) Filed: Jan. 12, 2023

(65) Prior Publication Data

US 2024/0149244 A1 May 9, 2024

(30) Foreign Application Priority Data

Nov. 7, 2022 (KR) ......................... 10-2022-0147150

(51) Int. Cl.
*B01J 20/26* (2006.01)
*B01J 20/28* (2006.01)
(Continued)

(52) U.S. Cl.
CPC ....... *B01J 20/267* (2013.01); *B01J 20/28007* (2013.01); *B01J 20/28016* (2013.01);
(Continued)

(58) Field of Classification Search
CPC ............... B01J 20/267; B01J 20/28007; B01J 20/28016; B01J 20/3085; C01F 11/183;
(Continued)

(56) References Cited

U.S. PATENT DOCUMENTS

2001/0033820 A1* 10/2001 Yaniv ................... C11D 3/1233
423/432

FOREIGN PATENT DOCUMENTS

KR        100725266        6/2007
KR        101524457        6/2015
(Continued)

OTHER PUBLICATIONS

Li ("Visualization and Characterization of Poly(amidoamine) Dendrimers by Atomic Force Microscopy") (Year: 2000).*
Tanaka ("Synthesis of calcium carbonate particles with carboxylic-terminated hyperbranched poly(amidoamine) and their surface modification") (Year: 2012).*
(Continued)

*Primary Examiner* — Daniel C. McCracken
*Assistant Examiner* — Starfari Teshawn McClain
(74) *Attorney, Agent, or Firm* — LEX IP MEISTER, PLLC

(57) ABSTRACT

Provided are carbon dioxide capture composite particles which contribute to carbon neutrality by fixing carbon dioxide in seawater or an aqueous solution in which calcium ions are dissolved through mineralization, and a method of producing the same. More particularly, provided are carbon dioxide capture composite particles which capture carbon dioxide in seawater to form calcium carbonate particles, preferably aragonite type calcium carbonate, and a method of producing the same. In an exemplary embodiment, a method of producing carbon dioxide capture composite particles including: immersing polyamidoamine particles in seawater or an aqueous solution in which calcium ions are dissolved and maintaining the solution at room temperature under normal pressure to produce carbon dioxide capture composite particles in which aragonite type calcium carbonate particles are formed on a surface of the polyamidoamine particles is provided.

12 Claims, 3 Drawing Sheets

(51) Int. Cl.

| | |
|---|---|
| *B01J 20/30* | (2006.01) |
| *C01F 11/18* | (2006.01) |
| *C02F 1/20* | (2023.01) |
| *C02F 1/28* | (2023.01) |
| *C02F 101/10* | (2006.01) |
| *C02F 103/08* | (2006.01) |
| *C08G 73/02* | (2006.01) |

(52) U.S. Cl.
CPC ......... *B01J 20/3085* (2013.01); *C01F 11/183* (2013.01); *C02F 1/20* (2013.01); *C02F 1/288* (2013.01); *C08G 73/028* (2013.01); *C02F 1/281* (2013.01); *C02F 1/285* (2013.01); *C02F 2101/10* (2013.01); *C02F 2103/08* (2013.01)

(58) Field of Classification Search
CPC .. C02F 1/20; C02F 1/288; C02F 1/281; C02F 1/285; C02F 2101/10; C02F 2103/08; C08G 73/028; C08L 79/02; Y02C 20/40; B01D 53/02; B01D 2253/10; B01D 2257/504
See application file for complete search history.

(56) References Cited

FOREIGN PATENT DOCUMENTS

| KR | 101967508 | 4/2019 |
|---|---|---|
| KR | 10-2209962 | 2/2021 |
| KR | 10-2022-0063429 | 5/2022 |
| KR | 102453047 | 10/2022 |
| WO | 2015046715 | 4/2015 |

OTHER PUBLICATIONS

Yuka Tanaka et al., "Synthesis of calcium carbonate particles with carboxylic-terminated hyperbranched poly (amidoamine) and their surface modification", Polymer Journal (2012) 44, 586-593, Mar. 28, 2012.
Ko Yasumoto et al., "Biogenic Polyamines Capture CO2 and Accelerate Extracellular Bacterial CaCO3 Formation", Mar Biotechnol (2014) 16:465-474, Feb. 5, 2014.
KIPO, Office Action of the corresponding Korean Patent Application No. 10-2022-0147150 dated Apr. 18, 2025, total 19 pages.
KIPO, Notice of Allowance of KR 10-2022-0147150 dated Oct. 28, 2025, total 7 pages.

* cited by examiner

CARBON DIOXIDE CAPTURE COMPOSITE PARTICLES AND METHOD OF PRODUCING THE SAME

CROSS-REFERENCE TO RELATED APPLICATIONS

This application claims priority under 35 U.S.C. § 119 to Korean Patent Application No. 10-2022-0147450, filed on Nov. 7, 2022, in the Korean Intellectual Property Office, the disclosure of which is incorporated herein by reference in its entirety.

TECHNICAL FIELD

The following disclosure relates to carbon dioxide capture composite particles which contribute to carbon neutrality by fixing carbon dioxide in seawater or an aqueous solution in which calcium ions are dissolved through mineralization, and a method of producing the same. More particularly, the following disclosure relates to carbon dioxide capture composite particles which capture carbon dioxide in seawater to form calcium carbonate particles, preferably aragonite type calcium carbonate, and a method of producing the same.

BACKGROUND

Petrochemical consumption in modern society leads to massive carbon emissions in the atmosphere, and the produced carbon dioxide is causing a global climate crisis. In order to solve the problem, technological progress to effectively capture the produced carbon dioxide is essential together with efforts to reduce production and consumption of petrochemicals.

Conventionally, a monoethanolamine (MEA) aqueous solution is used for adsorbing carbon dioxide, but there are disadvantages such as corrosion of equipment when using an aqueous solution, occurrence of toxic vapors, and a need for high temperatures when reforming adsorbed carbon dioxide. In addition, attempts have been made to adsorb carbon dioxide gas using inorganics such as zeolite, adsorbents containing polyethyleneimide (PEI), porous carbon, metal organic framework (MOF), and the like, but are highly affected by moisture in the air and temperature, and high pressure or high temperature are required for efficient adsorption. It is known that the carbon dioxide adsorption efficiency of MOF/GO-U3 is highest among the known adsorbents, which is at the level of 186 mg/g.

However, any technology to adsorb and remove carbon dioxide in water has not been developed.

RELATED ART DOCUMENTS

Patent Documents

Korean Patent Laid-Open Publication No. 10-2022-0063429 (May 17, 2022)

SUMMARY

The present inventors performed studies to provide carbon dioxide capture composite particles which are safer, are more convenient to use, and may further improve carbon dioxide capture efficiency, than conventionally known carbon dioxide absorbers, and a method of producing the same, and as a result, a new concept of carbon dioxide capture particles has been developed, thereby completing the present invention.

An embodiment of the present invention is directed to providing carbon dioxide capture composite particles which capture carbon dioxide in a particle form, and naturally undergo $CaCO_3$ mineralization in seawater, so that artificial additional energy input or a separate experimental device is not needed, and a method of producing the same.

Another embodiment of the present invention is directed to providing a method or producing a large amount of aragonite type calcium carbonate using seawater without a separate device or process.

In one general aspect, a method of producing carbon dioxide capture composite particles includes: immersing polyamidoamine particles in seawater or an aqueous solution in which calcium ions are dissolved and maintaining the solution at room temperature under normal pressure to produce carbon dioxide capture composite particles in which calcium carbonate particles are formed on a surface of the polyamidoamine particles.

In an exemplary embodiment, the calcium carbonate particles may be aragonite type calcium carbonate particles.

In another general aspect, carbon dioxide capture composite particles in which calcium carbonate particles are formed on a surface of polyamidoamine particles are provided.

In an exemplary embodiment, the carbon dioxide capture composite particles may be those in which aragonite type calcium carbonate particles meet each other and grow on the surface of polyamidoamine particles.

In an exemplary embodiment, the carbon dioxide capture composite particles may have a carbon dioxide immobilization efficiency of 50 mg-$CO_2$/g-polymer or more, more preferably 200 mg-$CO_2$/g-polymer or more.

Other features and aspects will be apparent from the following detailed description, the drawings, and the claims.

DETAILED DESCRIPTION OF EMBODIMENTS

Figure 1:
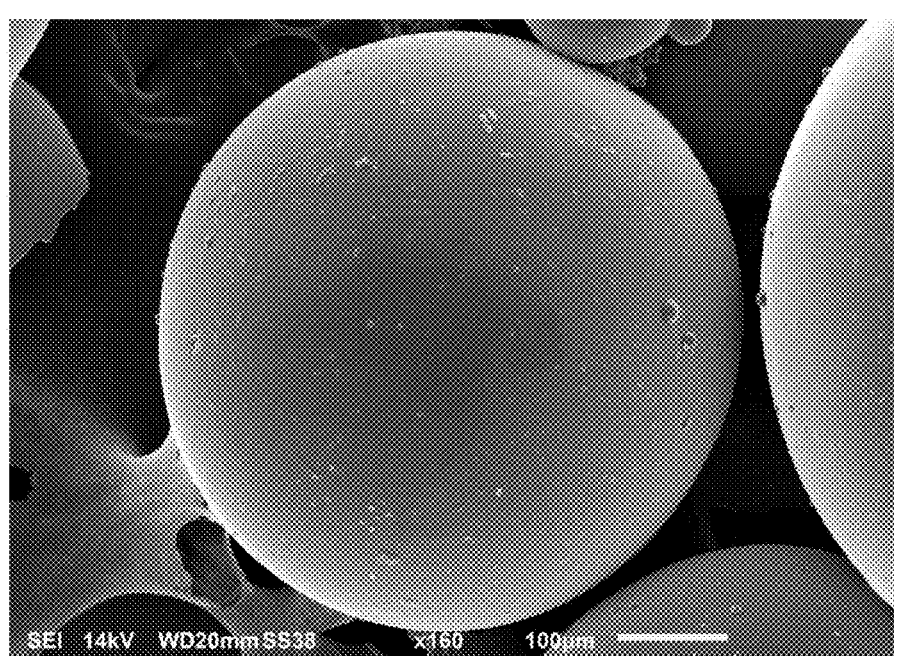
FIG. 1 is an electron micrograph in which a surface of a polyamidoamine particle produced in Production Example 1 is observed.

Hereinafter, the present invention will be described in more detail. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to include a plural form also, unless otherwise indicated in the context.

In addition, unless particularly described to the contrary, "comprising" any elements will be understood to imply further inclusion of other elements rather than the exclusion of any other elements.

An exemplary embodiment of the present invention provides a method of producing carbon dioxide capture composite particles including:

immersing polyamidoamine particles in seawater or an aqueous solution in which calcium ions are dissolved and maintaining the solution at room temperature under normal pressure to produce carbon dioxide capture composite particles in which calcium carbonate particles are formed on a surface of the polyamidoamine particles.

In an exemplary embodiment, the calcium carbonate particles may be aragonite type calcium carbonate particles.

In an exemplary embodiment, calcium carbonate particles may be formed under the conditions in which pH becomes 8 or more by an amine derivative produced when polyamidoamine particles are decomposed, after the polyamidoamine particles are immersed in seawater or an aqueous solution in which calcium ions are dissolved.

In an exemplary embodiment, 50 mg or more of the polyamidoamine particles may be used based on 200 mL of the seawater or the aqueous solution in which calcium ions are dissolved.

In an exemplary embodiment, the seawater or the aqueous solution in which calcium ions are dissolved may have a $Ca^{2+}$ concentration of 0.04 g/kg-water or more and a $CO_3^{2-}$ concentration of 0.02 g/kg-water or more.

In an exemplary embodiment, the polyamidoamine particles may be crosslinked particles produced from a polyfunctional amine monomer having at least two or more amine groups and a polyfunctional acrylamide monomer having at least two or more acryl groups.

In an exemplary embodiment, the polyamidoamine particles may be obtained by reacting the polyfunctional amine monomer and the acrylamide monomer at a mole ratio of 1:0.8 to 2.5.

In an exemplary embodiment, the polyfunctional amine monomer may be diamine having two primary amine groups and the polyfunctional acrylamide monomer may have two acryl groups.

In an exemplary embodiment, the polyamidoamine particles may have a particle size of 10 nm to 80 mm, but are not limited thereto.

Another exemplary embodiment of the present invention provides carbon dioxide capture composite particles in which calcium carbonate particles are formed on a surface of polyamidoamine particles are provided.

In an exemplary embodiment, the calcium carbonate particles may be aragonite type calcium carbonate particles.

In an exemplary embodiment, the carbon dioxide capture composite particles may be those in which the aragonite type calcium carbonate particles meet each other and grow on the surface of the polyamidoamine particles.

In an exemplary embodiment, the carbon dioxide capture composite particles may have a carbon dioxide immobilization efficiency of 50 mg-$CO_2$/g-polymer or more.

Hereinafter, each constituent element of the present invention will be described in more detail.

Calcium carbonate largely has three homogeneities of calcite, aragonite, and vaterite. Among them, aragonite is needle-shaped or orthorhombic particles, has a large aspect ratio, and is industrially used in various fields such as rubber, plastic, paint fillers, or pigments for papermaking. Aragonite is produced under high temperature conditions of 60° C. or higher or in the presence of magnesium ions. Aragonite has difficult production conditions as compared with other forms of calcium carbonate and costs a lot, and is in the most expensive form.

The inventors of the present invention found that as mineralization proceeds only by immersing a specific amine-based polymer, specifically polyamidoamine particles in seawater, calcium carbonate particles naturally grow on the surface of polyamidoamine particles, and in this process, since mineralization proceeds using carbon dioxide in seawater, newly and surprisingly, a carbon dioxide reduction effect may be simultaneously expressed, thereby completing the present invention. In addition, when polyamidoamine particles produced using a specific monomer at a specific mole ratio are used, a surprising effect of growing a large amount of aragonite type calcium carbonate particles was found.

Here, the seawater may be any one or a mixture of two or more selected from the group consisting of general seawater, seawater desalination concentrated water, brine, bittern, and the like. The aqueous solution in which calcium ions are dissolved may be artificial seawater, and specifically, an aqueous solution having a $Ca^{2+}$ concentration of 0.04 g/kg-water or more and a $CO_3^{2-}$ concentration of 0.02 g/kg-water or more is preferred since it may form a large amount of calcium carbonate particles, preferably a large amount of aragonite, but is not limited thereto.

In an exemplary embodiment, the polyamidoamine particles are crosslinked particles having a hyperbranch structure, and those including amine and an amide bond (or peptide bond) are more preferred for forming calcium carbonate. Hydrolysis of the amide allows the polyamidoamine particles to be decomposed in water. Usually, amide may be easily hydrolyzed and decomposed in deionized water at 37° C. within two weeks, and may be completely decomposed within three months.

However, surprisingly, when the polyamidoamine particles are immersed in seawater, the polyamidoamine particles are partly decomposed and swelled, and calcium carbonate particles, preferably aragonite type calcium carbonate particles are formed and grow in nano-sized pores formed on the surface of the swollen polyamidoamine particles. That is, under the conditions in which the polyamidoamine particles are decomposed to produce an amine derivative on the surface, resulting in pH of 8 or more, the concentration of carbonate ions is increased to create an environment in which calcium carbonate is easily formed. In addition, it is considered that the amine functional group of the decomposed polyamidoamine particles catches a calcium ion and the ammonium functional group thereof catches a carbonate ion, thereby locally increasing the concentration of mutual ions to mineralize calcium carbonate on the surface of the polyamidoamine particles. In addition, it is considered that calcium carbonate particles are formed and grow in nano-sized pores formed on the surface of the swollen polyamidoamine particles. Accordingly, a very surprising effect of producing a large amount of stable calcium carbonate particles in bulk seawater at room temperature under normal pressure may be provided. In addition, in this process, an effect of having a carbon dioxide immobilization efficiency of 50 mg-$CO_2$/g-polymer or more, 60 mg-CO2/g-polymer or more, preferably 100 mg-$CO_2$/g-polymer or more, and more preferably 200 mg-$CO_2$/g-polymer or more may be achieved.

In an exemplary embodiment, it is preferred to use 50 mg or more, preferably 100 mg or more of the polyamidoamine particles based on 200 mL of seawater since the conditions of pH 8 or more are formed without adding a separate base, thereby forming calcium carbonate particles, specifically aragonite type calcium carbonate particles, but the present invention is not limited thereto. In the case in which the amount of polyamidoamine particles is too small as compared with the amount of seawater, pH is maintained below 8, so that it may be difficult to produce aragonite.

In an exemplary embodiment, as the concentration of polyamidoamine particles in seawater is higher, the growth rate of aragonite is faster, and aragonite may be formed better under the conditions of pH 8 or more. Accordingly, a step of further adding a basic material to adjust the pH to 8 or more may be further included, if necessary, but nucleation of aragonite may occur within 10 hours by adjusting the content of polyamidoamine particles without adding a separate basic material, and aragonite may be formed within several days to several months.

In addition, without being limited, when the polyamidoamine particles are immersed in seawater, it is preferred to perform the process under the conditions in which metal or metal ions do not exist. The metal or the metal ions mean exclusion of adding a material to further cause a metallic material or metal ions in addition to ions present in seawater by themselves.

The polyamidoamine particles may be crosslinked particles produced from a polyfunctional amine monomer having at least two or more amine groups and a polyfunctional acrylamide monomer having at least two or more acryl groups.

Specifically, a method of producing the polyamidoamine particles may include:

a) preparing a polyamidoamine precursor aqueous solution from a polyfunctional amine monomer and a polyfunctional acrylamide monomer; and b) subjecting the polyamidoamine precursor aqueous solution to reverse phase suspension polymerization to obtain crosslinked polyamidoamine particles.

The polyfunctional amine monomer and the polyfunctional acrylamide monomer may produce a polyamidoamine precursor mixture by a Michael addition reaction in which the nitrogen atom of amine is reacted with an acryl group carbon of acrylamide. In addition, the Michael addition reaction is used in a crosslinking reaction for producing hyperbranched polyamidoamine particles, also in a reverse phase suspension polymerization method which is a later step.

The polyamidoamine precursor aqueous solution corresponds to an intermediate for producing crosslinked hyperbranched polyamidoamine particles, from the polyfunctional amine monomer and the polyfunctional acrylamide monomer, and is a mixture formed of an oligomeric monomolecule. For example, the polyamidoamine precursor mixture may include an oligomer obtained by reacting one amine monomer and one acrylamide monomer, an oligomer obtained by reacting two amine monomers and one acrylamide monomer, an oligomer obtained by reacting one amine monomer and two acrylamide monomers, an oligomer obtained by reacting two amine monomers and two acrylamide monomers, an oligomer obtained by reacting three amine monomers and two acrylamide monomers, an oligomer obtained by reacting two amine monomers and three acrylamide monomers, and the like.

As a specific amine compound and a acrylamide compound, in the case of using alkylenediamine (A) and bisacrylamide monomer (B), when each monomer is used to prepare a polyamidoamine precursor mixture, a linear oligomer compound such as A-B, A-B-A, B-A-B, A-BA-B, B-A-B-A, A-B-A-B-A, B-A-B-A-B, . . . may be obtained, and the polyamidoamine precursor mixture refers to the mixture thereof.

In addition, in the case of the alkylenediamine, since one amine group may undergo the Michael addition reaction with the acrylamide twice, a branched oligomer compound in which two acrylamides are bonded to one amine group, as well as a linear oligomer compound may be obtained, and the polyamidoamine precursor mixture in the present invention means inclusion of them also.

The polyfunctional amine monomer used in the present invention may have at least two or more amine groups in one monomer. That is, it may be diamine, triamine, or polyamine having two or more amine groups at the end of an alkylene group, and may include an amine group instead of a hydrogen atom in the middle of the alkylene group or have an alkyl group including an amine group instead of hydrogen substituted in the middle of the alkylene group. In the case of the diamine, primary diamine is capable of an additional crosslinking reaction since one amine group is capable of a Michael addition reaction with two acrylamides.

In an exemplary embodiment, the polyfunctional amine monomer may be ethylenediamine, 1,2-diaminopropane, 1,4-diaminobutane, hexamethylenediamine, diethylenetriamine, triethylenetetramine, tris(2-aminoethyl)amine, diaminocyclohexane, pentaethylenehexamine, 2-aminoethylpiperizine, and the like, and without being limited thereto, may be preferably ethylenediamine, 1,4-butylenediamine, diethylenetriamine, and the like.

In an exemplary embodiment, the polyfunctional acrylamide monomer may have at least two or more acryl groups in one monomer, and the number of acryl groups in the polyfunctional acrylamide monomer may be preferably 2 or 3, more preferably 2.

In an exemplary embodiment of the present invention, the polyfunctional amine monomer may be a diamine having two primary amine groups in one monomer, and the polyfunctional acrylamide monomer may have two acryl groups in one monomer.

An example of the polyfunctional acrylamide monomer may be N,N'-methylenebisacrylamide, N,N'-(1,2-dihydroxyethylene)bisacrylamide, N,N'-ethylenebisacrylamide, ethyleneglycol dimethacrylate, ethyleneglycol diacrylate, diethyleneglycol dimethacrylate, diethyleneglycol diacrylate, triethyleneglycol dimethacrylate, triethyleneglycol diacrylate, and the like, but is not limited thereto, and may be preferably N,N'-methylenebisacrylamide or N,N'-ethylenebisacrylamide.

In an exemplary embodiment, the step of preparing the polyamidoamine precursor mixture may be easily performed by selecting monomers having a difference in solubility in water between the monomers, when the reaction occurs in an aqueous solution state. That is, though a monomer having a large difference in solubility in water is first dissolved in water to be in an aqueous solution state and then a monomer which is not dissolved well in water is added all at once, the monomer which is not dissolved well in water has low solubility in water, an effect of slowly adding the monomer which is not dissolved well in water to an aqueous solution in which the monomer which is dissolved well in water is dissolved may be made in the end.

In an exemplary embodiment, for example, in the case of preparing the polyamidoamine precursor mixture by the Michael addition reaction of ethylenediamine and N,N-methylenebisacrylamide, the ethylenediamine may be present in a state of being dissolved well in an aqueous solution phase, as a B4 monomer which is dissolved well in water. However, since N,N'-methylenebisacrylamide which is an A2 monomer is not dissolved well in water, even in the case of adding N,N'-methylenebisacrylamide all at once to the ethylenediamine aqueous solution, the N,N'-methylenebisacrylamide is not all reacted all at once with ethylenediamine due to a difference in solubility in water, and in the initial state of the reaction, since ethylenediamine is present in absolute majority in the aqueous solution, the end of the polyamidoamine precursor mixture mostly includes an amine group.

After that, as the reaction continues, methylenebisacrylamide is slowly dissolved so that the Michael addition polymerization reaction continues to continuously prepare the hyperbranched polyamidoamine precursor mixture.

In the production of the crosslinked hyperbranched polyamidoamine particles of the present invention, a crosslinking degree may be adjusted by changing each mole ratio of the polyfunctional monomers without using an additional crosslinking agent.

Without being limited thereto, the polyfunctional amine monomer and the polyfunctional acrylamide monomer are reacted at a mole ratio of 1:0.8 to 2.5 for producing calcium carbonate, preferably at a mole ratio of 1:1 to 1.5 for producing aragonite type calcium carbonate and having excellent capture efficiency of carbon dioxide. As the content of the polyfunctional acrylamide monomer is increased, the crosslinking degree is increased, and in the case in which the crosslinking degree is increased too much, a moisture content is decreased so that the monomer is difficult to be swollen in seawater, and thus, the production of aragonite is hindered. However, the present invention is not limited to the mole ratio.

In the present invention, the reverse phase suspension polymerization may be performed without a stabilizer, or performed at 30 to 80° C. by dispersion in an organic solvent having a volume of 2 to 20 times the polyamidoamine precursor with the stabilizer. In an exemplary embodiment, when the aqueous solution of the polyamidoamine precursor mixture is dispersed in a water-insoluble solvent such as toluene or cyclohexane using an appropriate stabilizer, reverse suspension polymerization may be performed, and as the polymerization reaction proceeds, crosslinking occurs to form size-adjusted hyperbranched polyamidoamine particles.

In an exemplary embodiment, the solvent used in the reverse phase suspension polymerization may be any one selected from alkane having 5 to 12 carbon atoms, cycloalkane having 5 to 12 carbon atoms, and aromatic hydrocarbons having 6 to 12 carbon atoms, and the stabilizer may be any one or a mixture of two or more selected from sorbitan esters of fatty acids including span 60 and span 80, 12-butinoyloxy-9-octadecenate, poly(hydroxy stearic acid)-co-poly(ethylene oxide) block copolymers, and the like.

In an exemplary embodiment, the reverse phase suspension polymerization may be performed at 40 to 50° C. for 2 to 5 hours, but is not limited thereto.

The size of the polyamidoamine particles is not limited, but may be in a range of 10 nm to 80 mm, specifically 10 μm to 2000 μm, and more specifically 50 μm to 500 μm. Within the range, calcium carbonate particles may be efficiently produced, but the present is not limited thereto.

The carbon dioxide capture composite particles according to an exemplary embodiment of the present invention are those in which calcium carbonate particles are formed on the surface of polyamidoamine particles, and as a more specific exemplary embodiment, may be those in which the aragonite type calcium carbonate particles meet each other and grow on the surface of polyamidoamine particles.

In an exemplary embodiment, the aragonite type calcium carbonate particles may grow to be 50% or more, specifically 50 to 100% of the surface of the polyamidoamine particles. Since the surface area may be easily measured by using a photograph of SEM or the like, it will not be described further herein.

The carbon dioxide capture composite particles according to an exemplary embodiment of the present invention may provide an effect of a carbon dioxide immobilization efficiency of 50 mg-CO$_2$/g-polymer or more, preferably 100 mg-CO$_2$/g-polymer or more, and more preferably 200 mg-CO$_2$/g-polymer or more.

Hereinafter, the present invention will be described in more detail with reference to the examples and the comparative examples. However, the following examples and comparative examples are only one example for describing the present invention in more detail, and do not limit the present invention in any way.

<Evaluation of Physical Properties>

1. Mineralization of Carbon Dioxide in Seawater

In order to calculate the amount of carbon dioxide immobilized by mineralization of the amine-based polymer mixture prepared in the following examples, total carbon dioxide and alkalinity were measured using a dissolved inorganic carbon/alkalinity analyzer before and after adding a polymer, and then CO$_2$ decreased in seawater was calculated. Total carbon dioxide amounts before and after adding the polymer to seawater were indicated as C0 and C1, and were evaluated by the following Equation 1. The amount of seawater used was indicated as V, and the mass of the added polymer was indicated as MO.

$$\text{Total carbon dioxide} = [H_2CO_3] + [HCO_3^-] + [CO_3^{2-}]$$

$$\text{Total amount of carbon dioxide (μmol/kg seawater)} = C0-C1$$

$$\text{Amount of carbon dioxide (mmol) per g of polymer} = (C0-C1) \times V/M0 \times 0.001$$

$$\text{Amount of carbon dioxide (mg) per g of polymer} = (C0-C1) \times V/M0 \times 0.001 \times 44 \qquad \text{[Equation 1]}$$

2. Thermogravimetric Analysis

In order to calculate the amount of mineralized polyamidoamine particles in the examples, a thermogravimetric analyzer (TGA, Pyris 1, Perkin Elmer, USA) was used to analyze the ratios of the polymer (polyamidoamine particles) and mineral. The amount of mineral was based on the amount at 550° C. before CaCO$_3$ was pyrolyzed, and was evaluated by the following Equation 2. The wt % of the polymer at 550° C. before mineralization and the wt % of the polymer at 550° C. after mineralization were indicated as W0 and W1, and the mass of particles after mineralization was indicated as Ms.

$$\text{Amount of mineral (mg)} = (W1-W0)/100 \times Ms \qquad \text{[Equation 2]}$$

$$\text{Amount of carbon dioxide per g of polymer} = (Mm \times 44/100.09)/M0 \qquad \text{[Equation 3]}$$

wherein the amount of mineral (g) is indicated as Mm, and the mass of polymer before mineralization is indicated as M0.

3. Mineralization of Carbon Dioxide in Seawater

In order to calculate the amount of carbon dioxide immobilized by mineralization of polyamidoamine particles in the following examples, both a method of using a dissolved inorganic carbon/alkalinity analyzer and a method of using a mineral ratio obtained by thermogravimetric analysis were used.

Production Example 1

0.6 g (10 mmol) of ethylene diamine (EDA) and 1.541 g (10 mmol) of N,N'-methylene bisacrylamide (MBA) were added at the same mole ratio to a 1-neck round flask, 4 mL of distilled water was added thereto, and stirring was performed until the solution became a uniform mixture.

0.02 g of span 60 (Sorbitane monostearate) was dissolved in 16 mL of toluene, the solution was added to a 30 neck round bottom flask with the prepared precursor aqueous solution and reacted at 45° C. for 3.5 hours while blowing nitrogen, and washing with methanol and filtration were performed. The obtained particles were dried under vacuum at 60° C. for 24 hours.

The crosslinked polyamidoamine particles of Example 1 had an average particle diameter of 280 μm and a swelling ratio of 9.25 g/g.

FIG. 1 is an electron micrograph of the crosslinked polyamidoamine particles according to Production Example 1. Looking at FIG. 1, it was confirmed that the particles had a spherical shape and a smooth surface.

Production Example 2

Polyamidoamine particles were produced in the same manner as in Production Example 1, except that 8 mmol of EDA and 12 mmol of MBA were used.

Production Example 3

Polyamidoamine particles were produced in the same manner as in Production Example 1, except that 8 mmol of EDA and 16 mmol of MBA were used.

Production Example 4

Polyamidoamine particles were produced in the same manner as in Production Example 1, except that 12 mmol of EDA and 8 mmol of MBA were used.

Production Example 5

Polyamidoamine particles were produced in the same manner as in Production Example 1, except that 7 mmol of EDA and 21 mmol of MBA were used.

Example 1

The carbon dioxide mineralization of the polyamidoamine particles produced in Production Example 1 was evaluated using real seawater. Real seawater was filtered through 5 μm filter paper to filter out impurities, 100 mg of polyamidoamine particles were immersed in 200 mL of filtered seawater, the solution was allowed to stand at room temperature of 20° C., and a polymer sample was confirmed after one month and two months. After a certain period of time, polyamidoamine particles which had undergone mineralization were recovered, residual salts on the surface were washed with secondary distilled water, and drying at 50° C. was performed.

Figure 2:
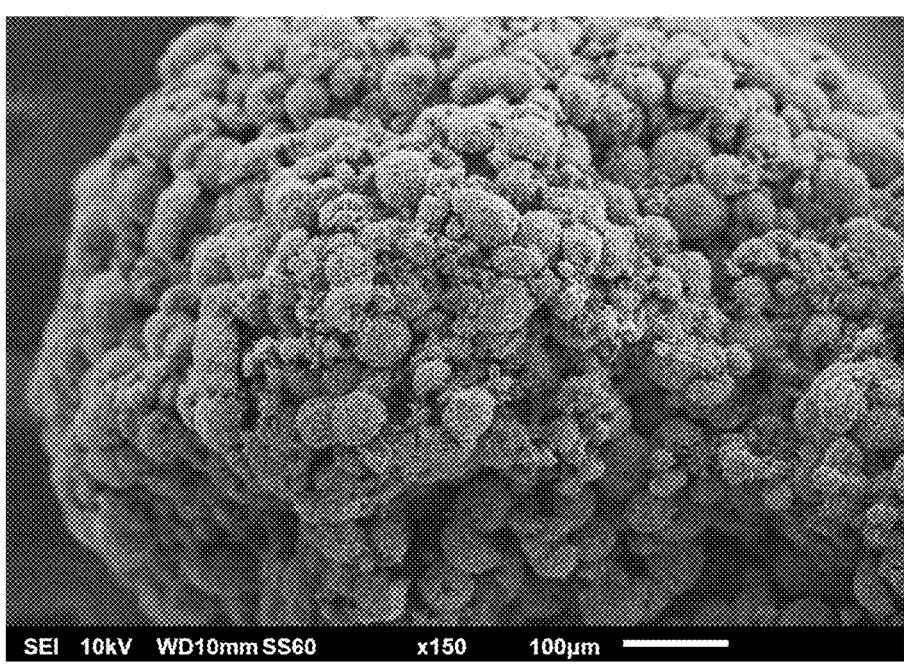
FIG. 2 is an electron micrograph of the particle of Production Example 1 which was immersed in seawater and then was recovered after one month of immersion and confirmed in Example 1.
Figure 3:
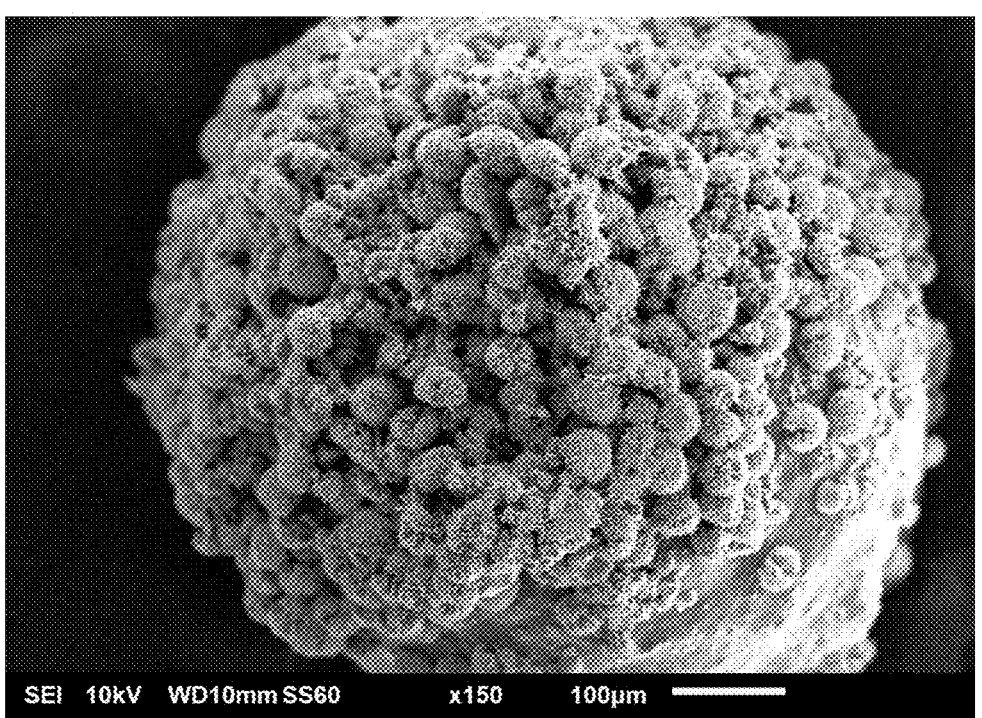
FIG. 3 is an electron micrograph of the particle of Production Example 1 which was immersed in seawater and then was recovered after two months of immersion and confirmed in Example 1.

FIG. 2 is an electron micrograph of the particle of Production Example 1 which was immersed in seawater and then recovered and confirmed after one month, and FIG. 3 is an electron micrograph of the particle which was recovered and confirmed after two months. After shown in FIGS. 2 and 3, it was confirmed that scaly aragonite grew on the surface of the particle.

Figure 4:
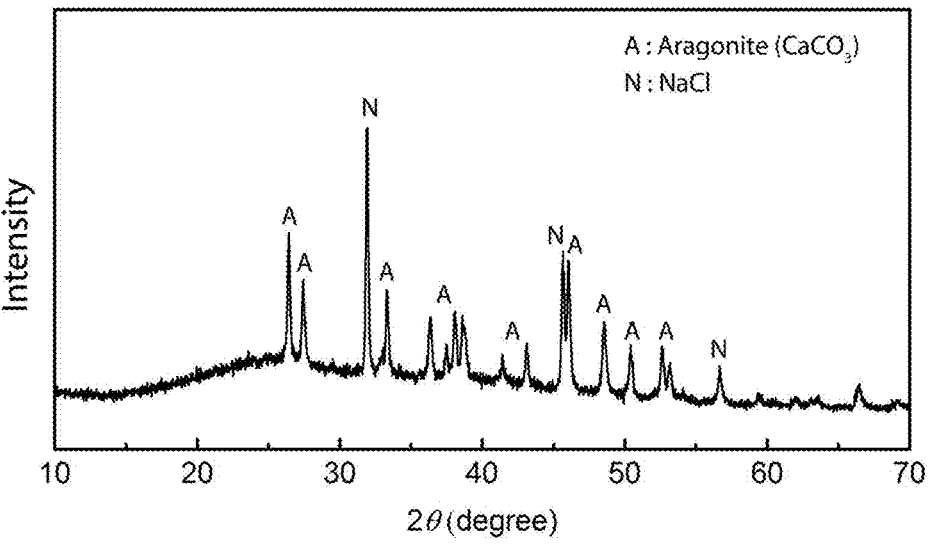
FIG. 4 is the results of X-ray spectroscopic diffraction analysis of a composite particle in which aragonite type calcium carbonate particles were formed after immersion in seawater in Example 1.

The results of X-ray spectroscopic diffraction analysis according to the evaluation method are shown in FIG. 4.

Figure 5:
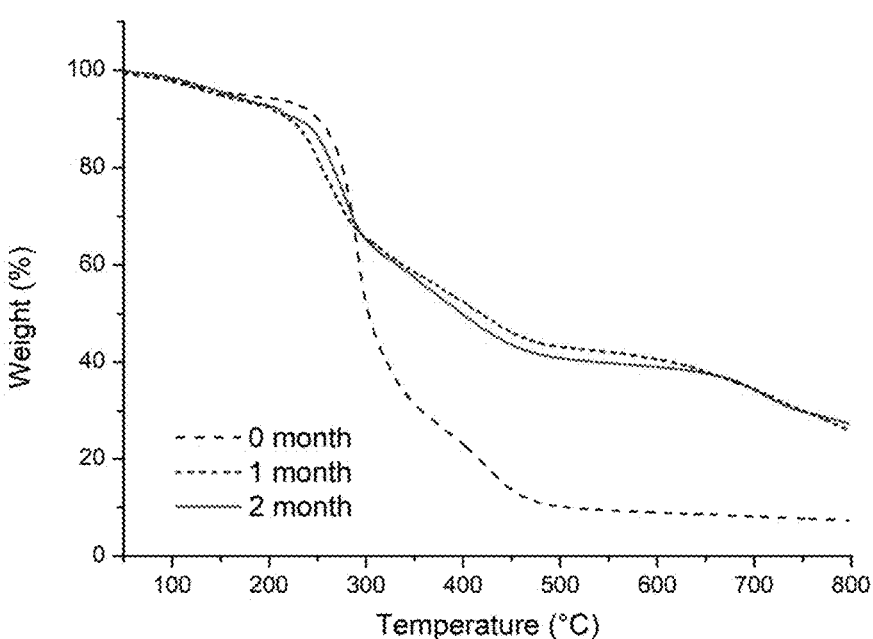
FIG. 5 is thermogravimetric analysis of a composite particle in which aragonite type calcium carbonate was formed after immersion in seawater in Example 1.

The results of thermogravimetric analysis according to the evaluation method are shown in FIG. 5.

Figure 6:
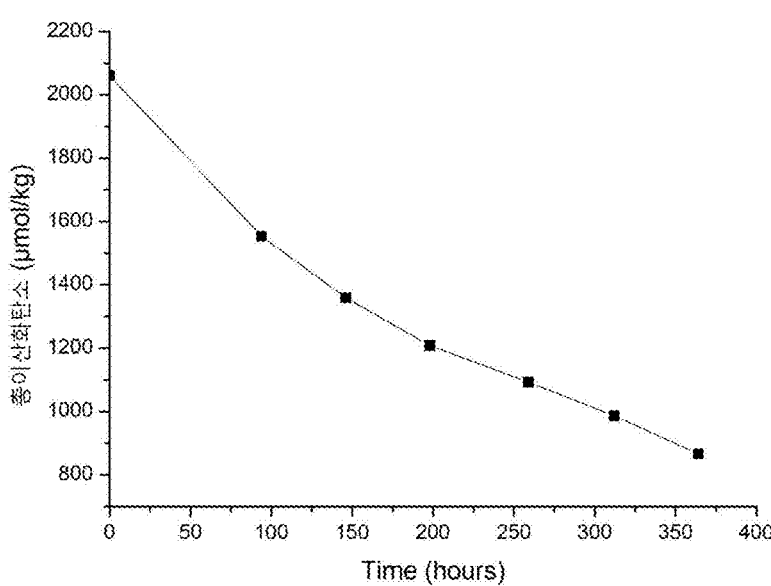
FIG. 6 shows a total amount of change in carbon dioxide in seawater for 15 days from the first day after immersing particles in seawater in Example 1.

In addition, a total amount of change in carbon dioxide from the first day to the fifth day after immersion in seawater is shown in FIG. 6.

Example 2

The experiment was performed in the same manner as in Example 1, except that the polyamidoamine particles produced in Production Example 2 were used instead of the polyamidoamine particles produced in Production Example 1.

Example 3

The experiment was performed in the same manner as in Example 1, except that the polyamidoamine particles produced in Production Example 3 were used instead of the polyamidoamine particles produced in Production Example 1.

Example 4

The experiment was performed in the same manner as in Example 1, except that an aqueous solution having a $Ca^{2+}$ concentration=0.41 g/kg-water and a $CO_3^{2-}$ concentration=0.016 g/kg-water which was the same as seawater was prepared and used instead of seawater ($Ca^{2+}$ concentration=0.41 g/kg-water, $CO_3^{2-}$ concentration=0.016 g/kg-water).

Example 5

The experiment was performed in the same manner as in Example 1, except that 0.15 g of the polyamidoamine particles produced in Production Example 1 were used and immersed in 5 L of seawater so that pH was maintained at 8.0 or less even though the amine-based polymer was hydrolyzed.

Comparative Example 1

The experiment was performed in the same manner as in Example 1, except that polylactic acid particles were used instead of the polyamidoamine particles produced in Production Example 1.

Comparative Example 2

The experiment was performed in the same manner as in Example 1, except that poly(butylene succinate) particles were used instead of the polyamidoamine particles produced in Production Example 1.

Comparative Example 3

The experiment was performed in the same manner as in Example 1, except for using distilled water which was fresh water instead of seawater. As a result, it was confirmed that the polyamidoamine particles were completely decomposed.

Comparative Example 4

The experiment was performed in the same manner as in Example 1, except that an aqueous solution having a $Ca^{2+}$ concentration=0.03 g/kg-water and a $CO_3^{2-}$ concentration=0.001 g/kg-water was prepared and used instead of seawater ($Ca^{2+}$ concentration=0.41 g/kg-water, $CO_3^{2-}$ concentration=0.016 g/kg-water).

Comparative Example 5

The experiment was performed in the same manner as in Example 1, except that the polyamidoamine particles produced in Production Example 4 were used instead of the polyamidoamine particles produced in Production Example 1.

Comparative Example 6

The experiment was performed in the same manner as in Example 1, except that the polyamidoamine particles produced in Production Example 5 were used instead of the polyamidoamine particles produced in Production Example 1.

TABLE 1

| | Whether aragonite type calcium carbonate particles were formed | Amount of carbon dioxide (mg) immobilized by mineralization per g of polymer | |
| --- | --- | --- | --- |
| | | Dissolved inorganic carbon/alkalinity analysis method | Thermogravimetric analysis method |
| Example 1 | o | 263 | 158 |
| Example 2 | o | 193 | 113 |
| Example 3 | o | 102 | 65 |
| Example 4 | o | 260 | 156 |
| Example 5 | x | — | — |
| Comparative Example 1 | x | — | — |
| Comparative Example 2 | x | — | — |
| Comparative Example 3 | x | — | — |
| Comparative Example 4 | x | — | — |
| Comparative Example 5 | x | — | — |
| Comparative Example 6 | x | — | — |

As seen in Table 1, it was confirmed that composite particles on which aragonite type calcium carbonate was formed even in seawater or artificial seawater were produced.

As seen in Examples 1 to 3, it was confirmed that when the polyamidoamine crosslinked particles were produced, mole ratios of monomers were adjusted, so that the aragonite type calcium carbonate was formed better. Specifically, it was confirmed that when MBA was used at an equimolar ratio to EDA or used in an excessive amount, aragonite was formed, and the aragonite was best formed in a range of a mole ratio of 1:0.8 to 2.5 and carbon dioxide adsorption efficiency was increased.

In addition, as seen in Example 4, it was confirmed that aragonite type calcium carbonate was formed in artificial seawater also.

In addition, as seen in Example 5, it was confirmed that aragonite was not formed well under the conditions of pH of less than 8 after immersing a small amount of polyamidoamine crosslinked particles in seawater.

As seen in Comparative Examples 1 and 2, it was confirmed that when different kinds of polymer particles were used, aragonite was not formed.

As seen in Comparative Example 3, it was confirmed that polyamidoamine crosslinked particles were decomposed in distilled water.

As seen Comparative Example 4, it was confirmed that aragonite was not formed in artificial seawater which was prepared to have lower $Ca^{2+}$ concentration and $CO_3^{2-}$ concentration than seawater.

As seen in Comparative Examples 5 and 6, it was confirmed that when the ratios of EDA and MBA were more than or less than a limit ratio, the polyamidoamine crosslinked particles were not formed or aragonite was not formed.

As described above, the method used in the present invention is a method of immobilizing carbon dioxide in seawater or an aqueous solution in which calcium ions are dissolved by mineralization, and does not require a separate experimental device and is capable of capture carbon dioxide under general seawater conditions of room temperature and normal pressure, and thus, is very effective. In addition, a very high capture efficiency of 263 mg-$CO_2$/g-polymer (dissolved inorganic carbon/alkalinity analyzer); 158 mg-$CO_2$/g-polymer (thermogravimetric analysis) is shown.

Since the carbon dioxide capture composite particles according to an exemplary embodiment of the present invention are in a particle form, they do not cause corrosion, are easy to use, do not need a separate device or process, and are mineralized only by immersing and maintaining the particles in seawater or an aqueous solution in which calcium ions are dissolved to form aragonite type calcium carbonate on the surface. In this process, carbon dioxide is captured, and a carbon dioxide immobilization efficiency at this time is 60 mg-$CO_2$/g-polymer or more, more preferably 200 mg-$CO_2$/g-polymer or more, and thus, an effect equal to or better than conventionally known carbon dioxide absorbers may be achieved.

In addition, the carbon dioxide capture composite particles according to the present invention do not need a separate device or process conditions such as high temperature or high pressure, may produce a large amount of aragonite through mineralization in seawater or an aqueous solution in which calcium ions are dissolved, and may achieve a carbon dioxide reduction effect.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A method of producing carbon dioxide capture composite particles, the method comprising:

immersing polyamidoamine particles in seawater or an aqueous solution in which calcium ions are dissolved and maintaining the solution at room temperature under normal pressure to produce carbon dioxide capture composite particles in which calcium carbonate particles are formed on a surface of the polyamidoamine particles, wherein the polyamidoamine particles are crosslinked particles produced from a polyfunctional amine monomer having at least two or more amine groups and a polyfunctional acrylamide monomer having at least two or more acryl groups.

2. The method of producing carbon dioxide capture composite particles of claim 1, wherein the calcium carbonate particles are aragonite type calcium carbonate particles.

3. The method of producing carbon dioxide capture composite particles of claim 1, wherein the calcium carbonate particles are formed under conditions in which pH becomes 8 or more by an amine derivative produced when polyamidoamine particles are decomposed, after the polyamidoamine particles are immersed in the seawater or the aqueous solution in which calcium ions are dissolved.

4. The method of producing carbon dioxide capture composite particles of claim 3, wherein 50 mg or more of the polyamidoamine particles are used based on 200 ml of the seawater or the aqueous solution in which calcium ions are dissolved.

5. The method of producing carbon dioxide capture composite particles of claim 1, wherein the seawater or the aqueous solution in which calcium ions are dissolved has a $Ca^{2+}$ concentration of 0.04 g/kg-water or more and a $CO_3^{2-}$ concentration of 0.02 g/kg-water or more.

6. The method of producing carbon dioxide capture composite particles of claim 1, wherein the polyamidoamine particles are obtained by reacting the polyfunctional amine monomer and the acrylamide monomer at a mole ratio of 1:0.8 to 2.5.

7. The method of producing carbon dioxide capture composite particles of claim 1, wherein the polyfunctional amine monomer is a diamine having two primary amine groups, and the polyfunctional acrylamide monomer has two acryl groups.

8. The method of producing carbon dioxide capture composite particles of claim 1, wherein the polyamidoamine particles have a particle size of 10 nm to 80 mm.

9. Carbon dioxide capture composite particles produced by the method of claim 1 in which calcium carbonate particles are formed on a surface of polyamidoamine particles.

10. The carbon dioxide capture composite particles of claim 9, wherein the calcium carbonate particles are aragonite type calcium carbonate particles.

11. The carbon dioxide capture composite particles of claim 10, wherein the carbon dioxide capture composite particles are those in which the aragonite type calcium carbonate particles meet each other and grow on the surface of the polyamidoamine particles.

12. The carbon dioxide capture composite particles of claim 9, wherein the carbon dioxide capture composite particles have a carbon dioxide immobilization efficiency of 50 mg-$CO_2$/g-polymer or more.

* * * * *